United States Patent
Hughes

[11] Patent Number: 6,137,254
[45] Date of Patent: Oct. 24, 2000

[54] ACTIVE VIBRA-ACOUSTIC DAMPER

[75] Inventor: John G. Hughes, Winter Park, Fla.

[73] Assignee: Lockheed Martin Corporation, Bethesda, Md.

[21] Appl. No.: 09/336,763

[22] Filed: Jun. 21, 1999

[51] Int. Cl.[7] .................................................. G05B 5/01
[52] U.S. Cl. ............................................ 318/611; 359/555
[58] Field of Search ............................. 318/611–623, 629; 359/554, 555; 74/5 R, 5.22

[56] References Cited

U.S. PATENT DOCUMENTS

| | | | |
|---|---|---|---|
| 4,206,400 | 6/1980 | Holdren et al. | 324/61 R |
| 4,367,913 | 1/1983 | Logan et al. | 350/500 |
| 4,881,800 | 11/1989 | Fuchs et al. | 350/500 |
| 5,184,055 | 2/1993 | Ohishi et al. | 318/615 |
| 5,203,220 | 4/1993 | Lerman | 74/5.22 |
| 5,307,206 | 4/1994 | Haessig, Jr. | 359/555 |
| 5,828,014 | 10/1998 | Goto et al. | 187/292 |

FOREIGN PATENT DOCUMENTS

WO97/41460  11/1997  WIPO .

*Primary Examiner*—David Martin
*Assistant Examiner*—Rina I. Duda
*Attorney, Agent, or Firm*—Burns, Doane, Swecker & Mathis, LLP

[57] ABSTRACT

The present invention relates to a gimbal assembly having a belt driven mirror, wherein an active vibra-acoustic damper is used to reduce vibra-acoustic energy induced line of sight disturbances resulting from belt mode resonant amplification. Exemplary embodiments of the present invention improve system performance far beyond the capability of a passive damper by actively countering vibra-acoustic disturbance torque and line of sight disturbances (i.e., substantially reducing and/or effectively canceling these disturbances).

13 Claims, 13 Drawing Sheets

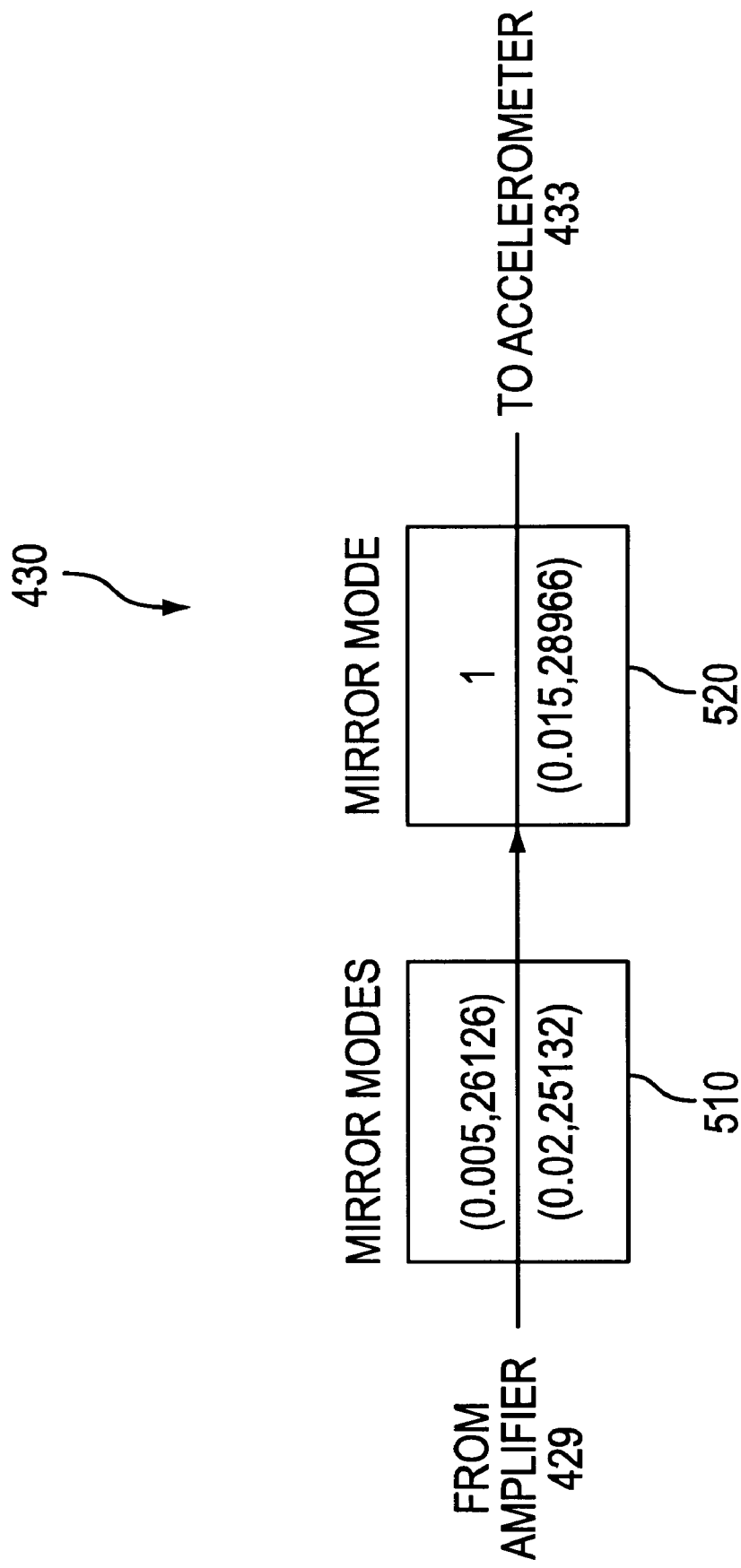

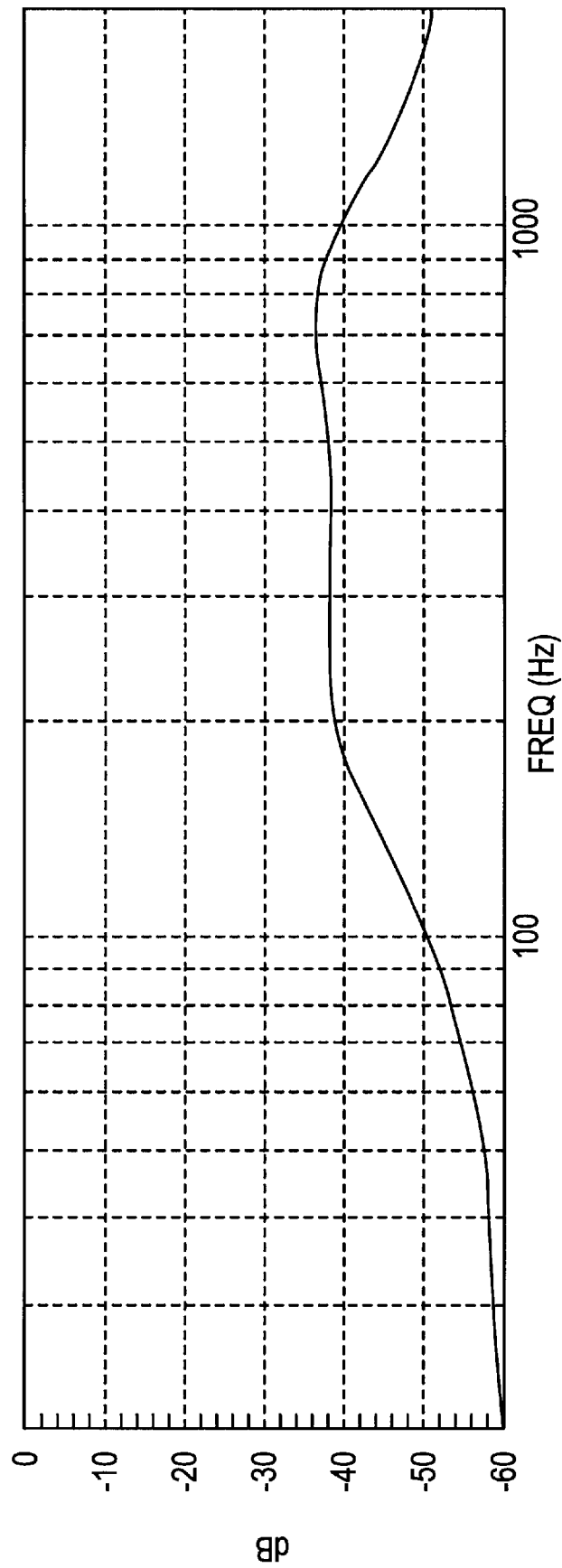

ACTIVE VIBRA-ACOUSTIC DAMPER

BACKGROUND OF THE INVENTION

1. Field of the Invention

The present invention relates to optical systems. More particularly, the present invention relates to an optical system that employs active vibra-acoustic damping.

2. Background Information

Gimbal assemblies are commonly employed in optical systems, such as forward looking infrared (FLIR) and laser based targeting and imaging systems, to position and/or stabilize optics, including mirrors. Precise pointing and stabilization of the optical line of sight is important to ensure line of sight accuracy, modulation transfer function, and so forth. Known gimble assemblies include mirrors and/or lens assemblies that are controlled by belt drive systems, wherein a belt couples a belt drive motor situated on a gyro platform with a rotatable mirror of the gimbal assembly.

Gimbal assemblies having belt drive systems are often used in applications where they are subjected to significant vibra-acoustic energy. Vibra-acoustic energy can disturb and/or degrade stabilization performance. In a gimbal assembly having a belt driven mirror, belt mode resonance causes amplification of mirror vibration, that results in degradation of system performance. For example, mirror vibration can reduce the line of sight accuracy in a forward looking infrared radar/laser based optical system, further resulting in the degradation of targeting and/or imaging accuracy.

FIG. 1A shows a gain response for a 2:1 belt mirror drive system, which does not employ any damping to counter vibrations due to acoustic energy. The vibra-acoustic energy causes the belt drive and mirror to vibrate at a frequency known as the belt modal frequency. FIG. 1A illustrates a belt modal frequency around 400 hertz as evidenced by the 52 decibel gain. The 52 decibel gain illustrated in FIG. 1A results in a substantial line of sight (LOS) disturbance of approximately 170 micro-radians root mean squared (RMS). FIG. 1B shows an associated phase response of the 2:1 belt mirror drive system wherein a phase crossover (and thus a reversal in torque) occurs at the disturbance of approximately 170 micro-radians root mean squared.

Known systems use passive dampers to counter vibrations due to vibra-acoustic energy disturbance (e.g., vibra-acoustic disturbance torque). An exemplary passive damper can comprise a piece of tungsten steel mounted with rubber in shear, wherein the rubber has a high internal damping coefficient. Passive dampers are also known in the art as inertial dampers or constrained layer dampers. However, passive dampers have several limitations. For example, passive dampers are limited in their ability to counter the effects of vibra-acoustic disturbance energy. Passive dampers typically provide only a 14 decibel (i.e., a factor of approximately 5.0) improvement over undamped systems. Although passive dampers do provide some improvement, a significant amount of line of sight disturbance can still result. In addition, passive dampers do not function efficiently, or at all, in cold environments.

SUMMARY OF THE INVENTION

The present invention relates to a gimbal assembly having a belt driven mirror, wherein an active vibra-acoustic damper is used to reduce vibra-acoustic energy induced line of sight disturbances resulting from belt mode resonant amplification. Exemplary embodiments of the present invention improve system performance far beyond the capability of a passive damper by actively countering vibra-acoustic disturbance torque and line of sight disturbances (i.e., substantially reducing and/or effectively canceling these disturbances).

Exemplary embodiments are directed to a method for reducing vibra-acoustic noise disturbances comprising the steps of measuring an acceleration of the mirror; filtering the measured acceleration to provide a filtered acceleration signal; and determining a feedback torque to attenuate said vibra-acoustic noise using said filtered acceleration signal. The feedback torque can be combined (e.g., subtracted) from a torque command for a drive motor of said mirror. The step of filtering can be used to remove frequencies in the measured acceleration signal which are above and below the belt mirror modal frequency, the belt mirror modal frequency being primarily a function of the belt stiffness and the mirror inertia in the belt driven mirror of the gimbal assembly. The measured acceleration can be determined in any manner. For example, in a gimbal assembly having a belt driven mirror, an accelerometer can be located on the mirror, or on a pulley attached to the mirror and driven by the belt.

BRIEF DESCRIPTION OF THE DRAWINGS

Other objects and advantages of the present invention will become apparent from the following detailed description of preferred embodiments when read in conjunction with the accompanying drawings, wherein like elements are designated by like reference numerals, and wherein:

FIG. 5 is a block diagram of the mirror response in accordance with the exemplary embodiment of FIG. 4;

FIGS. 9A and 9B are graphs of the gain and phase response of an exemplary 2:1 belt driven mirror with active damping, wherein the belt mode resonance has been substantially attenuated.

DETAILED DESCRIPTION OF THE PREFERRED EMBODIMENT

An active damping system in accordance with an exemplary embodiment of the present invention stabilizes the line of sight of a belt driven mirror in a gimbal assembly when vibra-acoustic noise induces belt mode resonance. Gimbal assemblies steer the line of sight of the mirror using a mirror motor situated on a gyro platform, and an associated belt drive. As such, the active damper is configured to be insensitive to lower frequencies, thereby allowing the gimbal assembly to move the mirror at a relatively slow constant rate. The active damper prevents the higher natural frequencies from exciting the mirror and destabilizing the line of sight. In an exemplary embodiment the system attempts to hold the vibration of the inertial line of sight to zero.

Figure 2:
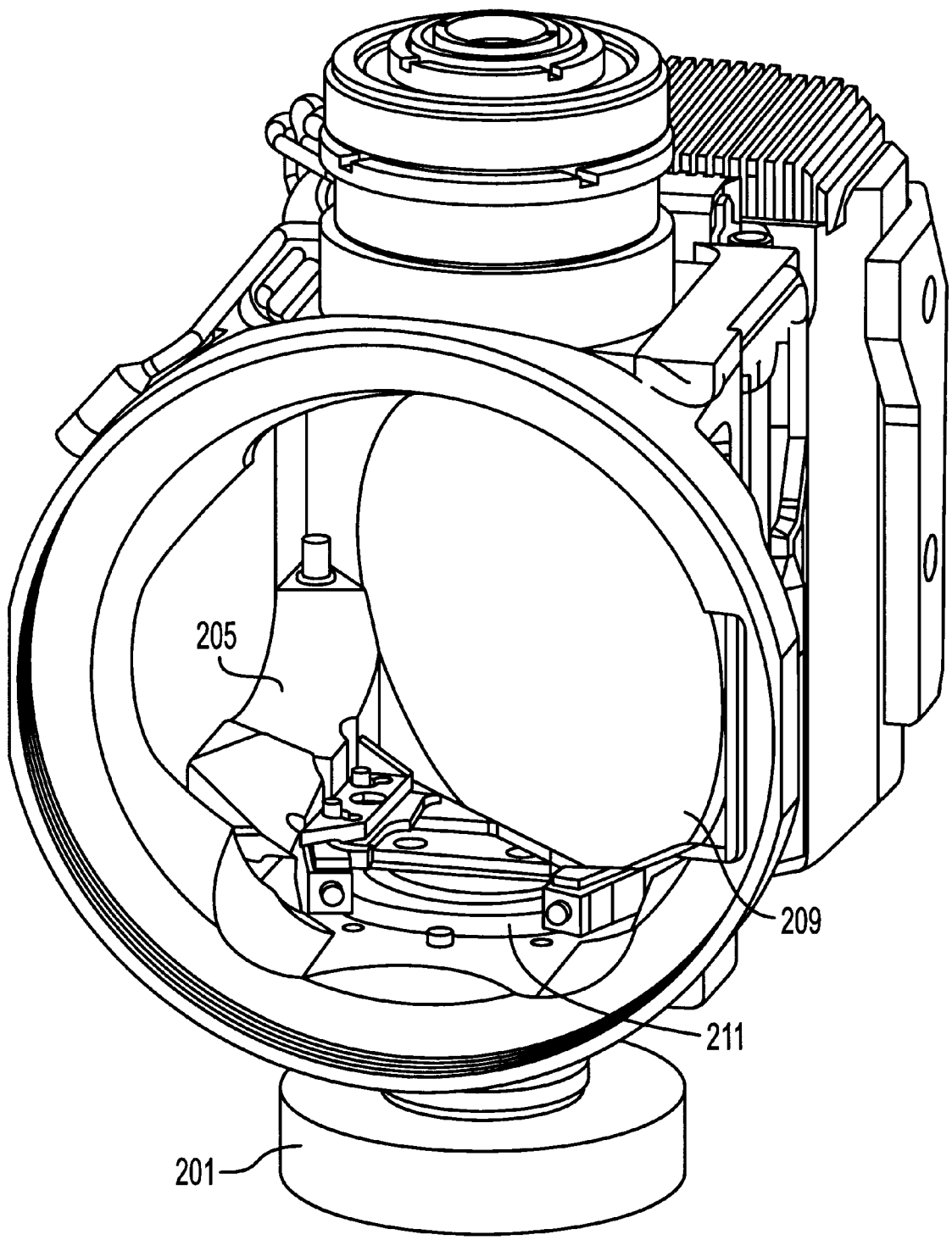
FIG. 2 illustrates an exemplary embodiment of a gimbal assembly having a belt driven mirror with active damping of vibra-acoustic energy in accordance with the present invention.

FIG. 2 illustrates a gimbal assembly system having a belt driven mirror with active vibra-acoustic damping according to an exemplary embodiment of the present invention. In the FIG. 2 embodiment, the active damping is achieved by a damper motor 201, which imparts torque to gimbal assembly 211 to counteract vibra-acoustic disturbance torque acting on the mirror 209 attached to gimbal assembly 211. To counteract (i.e., attenuate and/or cancel) vibra acoustic noise, acceleration of the mirror is measured and used to control the damper mode 201. For example, mirror acceleration can be measured using one or more accelerometers. In the FIG. 2 embodiment, accelerometer 205 is provided, and can be a standard-accelerometer and charge amplifier (e.g., accelerometer and associated signal conditioning electronics) which measures the acceleration of the mirror due to the vibra-acoustic noise. Because the mirror is attached to the gimbal assembly, the accelerometer 205 can be attached to the gimbal assembly.

The accelerometer 205 provides an acceleration signal which is filtered to, for example, remove frequencies above and below the belt/mirror modal frequency. As those skilled in the art will appreciate, the belt mirror modal frequency is primarily a function of the mirror drive belt stiffness and the mirror inertia. The filtered acceleration signal can be supplied to the damper motor 201 to counteract the effects of the vibra-acoustic noise and belt mode resonant amplification of mirror.

Figure 3:
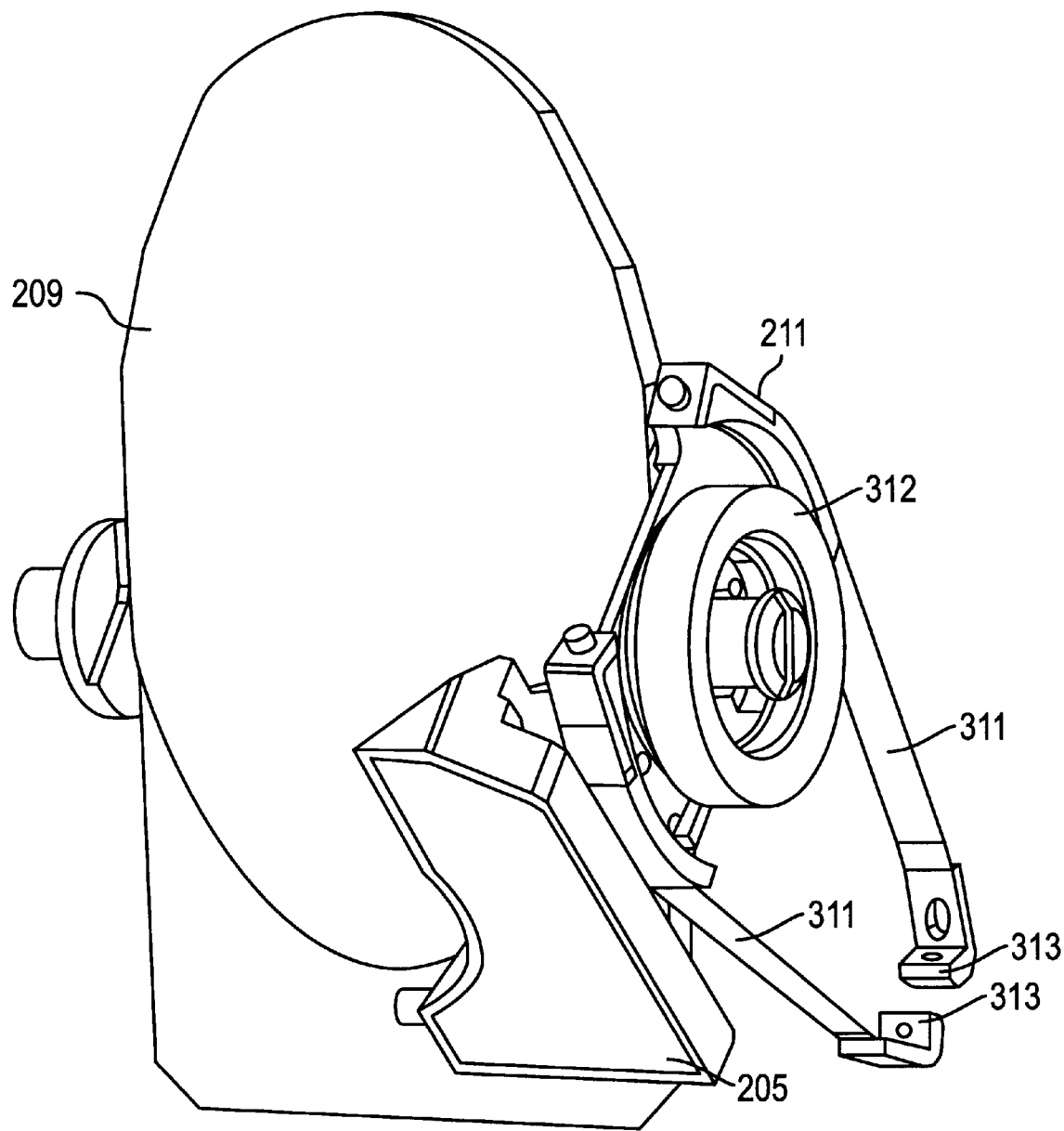
FIG. 3 illustrates another view of the belt driven mirror of FIG. 2.

FIG. 3 is another view of the FIG. 2 mirror and belt drive. This view illustrates metal bands 311 which constitute the mirror drive belts, and which are attached to gimbal assembly 211. Metal bands 311 are driven by a motor (not shown) attached to connectors 313, and used to drive mirror 209 via an attached pulley 312. In the FIG. 3 embodiment, the accelerometer and associated accelerometer signal processing electronics are located on a mirror drive pulley. However, those skilled in the art will appreciate that the accelerometer and electronics can be located anywhere that they will provide a mirror acceleration signal including, but not limited to, on a centerline of the mirror (e.g., for an elliptical mirror, on a centerline of the long axis of the mirror).

Figure 4:
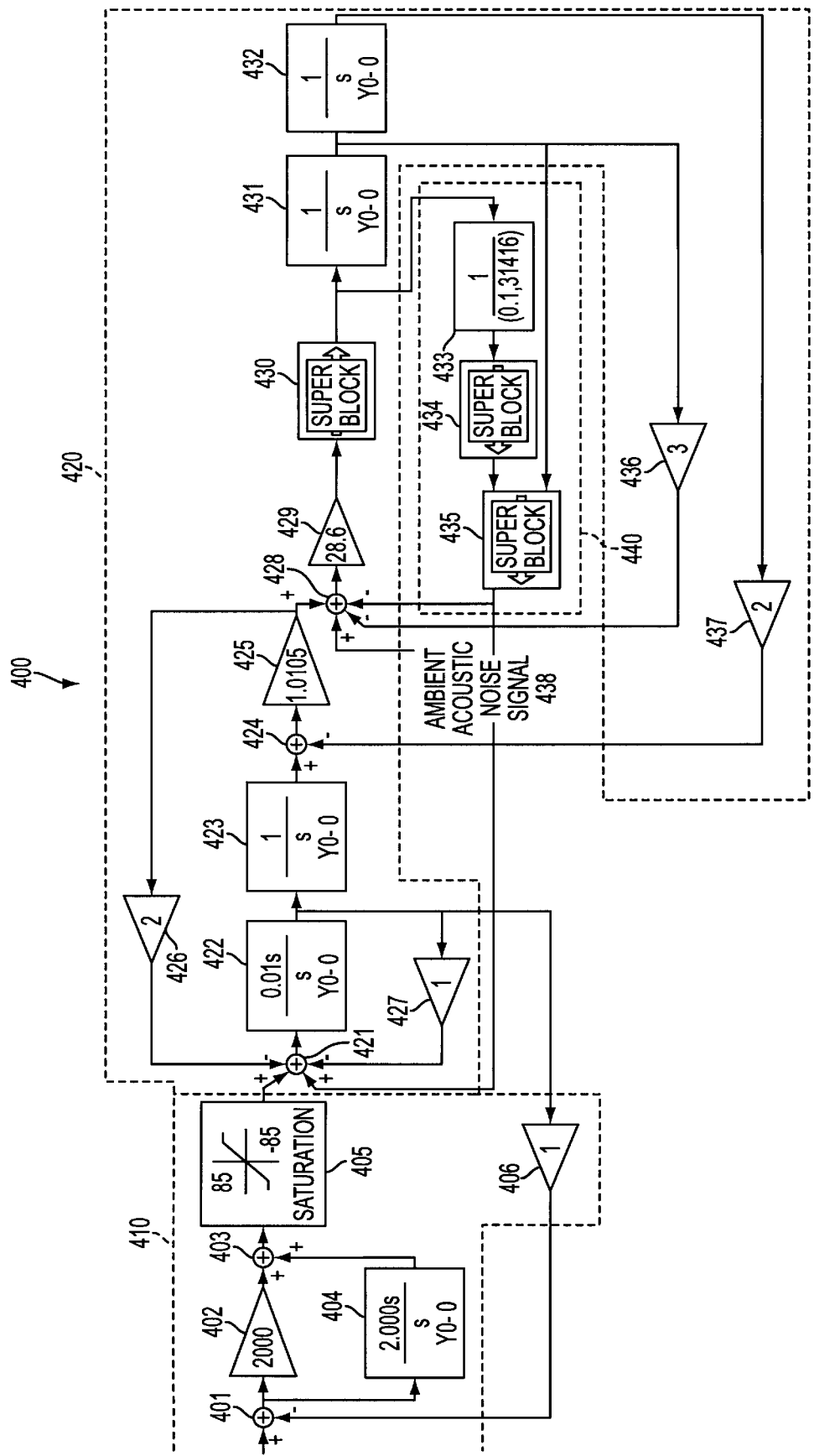
FIG. 4 is a functional block diagram of a 2:1 belt driven mirror in a gimbal assembly with active damping in accordance with an exemplary embodiment of the present invention.

FIG. 4 shows a block diagram of 2:1 belt mirror drive system 400 with active damping for a gimbal assembly. The 2:1 belt mirror drive system 400 of FIG. 4 includes a rate loop compensator 410 (e.g., a known PI compensator with proportional (P) gain of 2000 and integral (I) gain of 200,000 (i.e., 20015)), comprising summing junctions 401 and 403, rate loop integrator 404, amplifiers 402 and 406, and limiter 405. The drive system 400 also includes mechanism dynamics 420 comprising gain blocks 425, 426, 427, 429, 436 and 437, integrators 422, 423, 431 and 432, summing junctions 421, 424 and 428, and a mirror modes response 430. An active vibra-acoustic damper 440 of the mechanism dynamics 440 comprises, in accordance with an exemplary embodiment of the present invention, accelerometer 433, active damper filter 434 and damper current loop, and damper motor model 435.

Rate loop compensator 410 illustrates an exemplary proportional plus integral controller, and does not constitute a part of the present invention per se. Although there are specific values shown in FIG. 4, those skilled in the art will recognize that the values can change depending upon the configuration and size of the gimbal assembly. The rate loop compensator 410 generates signals used to reduce and/or eliminate errors induced by vibration.

A compensated gimbal assembly position error signal is a rate command signal which enters rate loop compensator 410 at summing junction 401. A second input to summing junction 401 is a rate feedback signal. The output signal of summing junction 401 represents a gimbal assembly velocity error. When the system is not in a disturbance environment, the output of summing junction 401 is zero or approximately zero.

The gimbal assembly velocity error signal is forwarded to amplifier 402 which provides a rate loop proportional gain. The output signal from amplifier 402 and the output signal from rate loop integrator 404 are summed at summing junction 403. The output signal of summing junction 403 is a rate loop compensated error signal. The rate loop compensated error signal is sent through limiter 405, to produce a signal that represents the torque generated by the motor of the gimbal assembly. Limiter 405 limits the torque to a predetermined limit, such as ±85 (inch/ounces). The signal representing the torque generated by the motor of the gimbal assembly is then applied to the mechanism dynamics 420, representing the dynamics of the gimbal assembly.

In general, the input signals to summing junction 421 represent each torque presently acting on the gimbal assembly system. The output of the summing junction 421 represents the total torque applied by the mirror drive motor of the gimbal assembly to the gyro platform which supports the mirror drive motor.

A first input signal to summing junction 421 represents the output of block 405 (i.e., the amount of torque generated by the mirror drive motor on the gyro platform side of the gimbal assembly). A second input signal to summing junction 421, received from amplifier 426, represents the amount of torque reflected to the gyro platform from the mirror via the belt drive. The second input signal is subtracted from the other input signals at summing junction 421. A third input signal to summing junction 421, which is the output signal of damper current loop 435, represents the reaction torque generated by the damper motor 201. A fourth input signal to summing junction 421 is a signal from gain block 427, and represents the damping velocity on the gyro platform of the gimbal assembly.

The output signal of summing junction 421 is the net torque which is applied to the gyro platform inertia which is represented by integrator 422. The integrator 422 has a gain which corresponds to the inverse inertia of the gyro platform (e.g., gain of 0.18 in an exemplary embodiment of the present invention). Integrator 422 therefore is associated with two functions. First, integrator 422 is used to calculate acceleration on the gyro platform side of the gimbal assembly. The 0.18 gain factor represents the inverse value of inertia, because torque divided by inertia is acceleration. The second function of integrator 422 is to integrate the acceleration on the gyro platform side of the gimbal assembly to produce a signal representing velocity on the gyro side of the gimbal assembly. Integrator 423 receives the gyro platform side velocity signal and outputs a signal representing the inertial position on the gyro platform side, which is forwarded to summing junction 424. Summing junction 424 subtracts a mirror position signal from the gyro platform side inertial position signal, wherein the mirror position signal is derived from amplifier 437. Amplifier 437 has a gain of 2 for a belt drive ratio of 2:1. The output signal of summing junction 424 represents the difference between the position of the mirror and that of the gyro platform. Gain block 425 represents the belt stiffness, and an output of the gain block 425 represents the torque which will be applied to the mirror as a result of the belt stretching.

Summing junction 428 sums the signals representing the torque acting on the mirror. The ambient acoustic noise signal 438 is added to the signal output from amplifier 425, which represents the desired torque for steering the mirror (i.e., steering the line of sight). The ambient acoustic noise signal 438 is the undesired disturbance torque due to acoustics, which is to be attenuated in accordance with the present invention. The output of gain block 436 is the viscous damping term for the mirror side of the gimbal assembly (i.e., gain which is a function of rotational mirror speed due, for example to oil on the mirror bearings). The output of block 435 is the damper motor torque used to attenuate the ambient acoustic noise signal 438. The output signal of summing junction 428 thus represents the net torque applied to the mirror side of the gimbal assembly, and is applied to gain block 429.

Gain block 429 has a gain of 28.6 in an exemplary embodiment of the present invention. However, the gain can be selected to represent inverse mirror inertia, and the output signal of gain block 429 represents mirror acceleration. The mirror acceleration signal is applied to the mirror modes response 430 which represents the dynamics of the mirror.

Mirror modes response 430 comprises elements 510 and 520, as seen in FIG. 5. The mirror has natural frequencies associated with it, which can be calculated by exciting the mirror with a swept sinusoid waveform, or using finite element modeling (FEM).

Figure 6A:
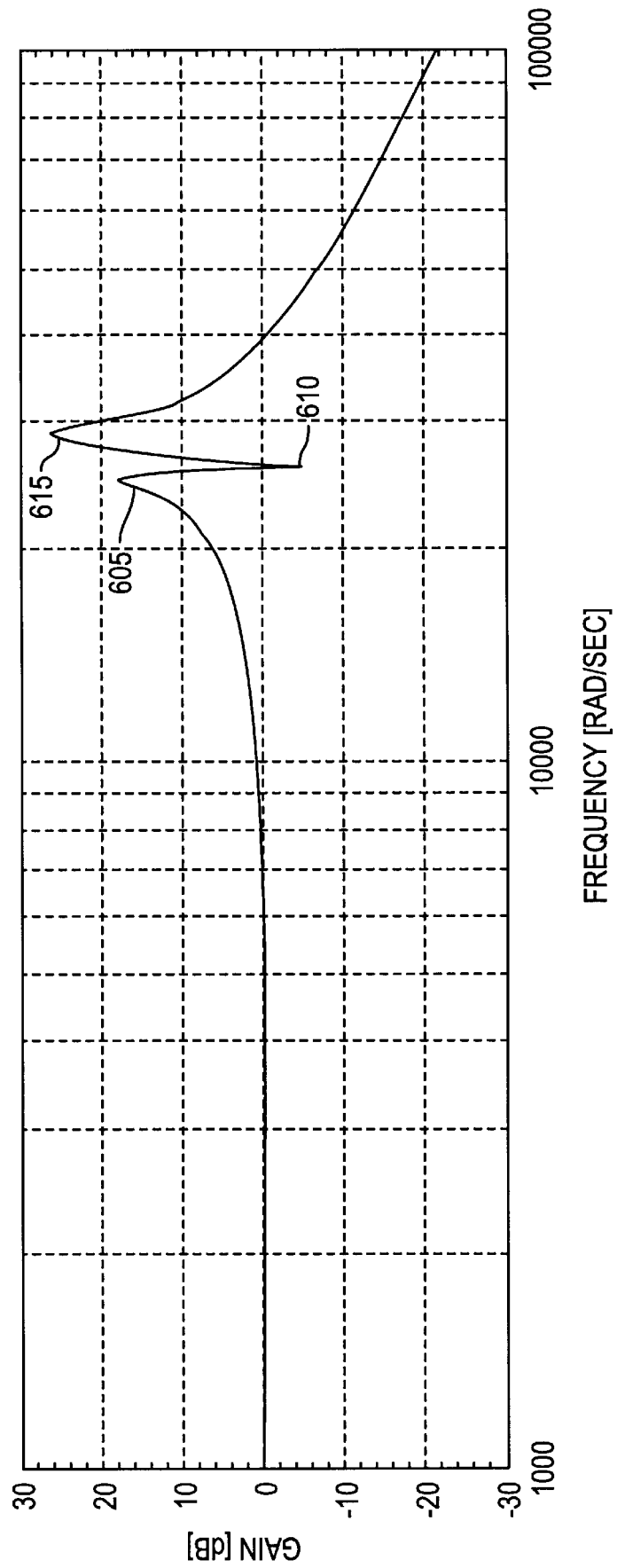
FIG. 6 is a graph of an exemplary frequency response of a mirror.
Figure 6B:
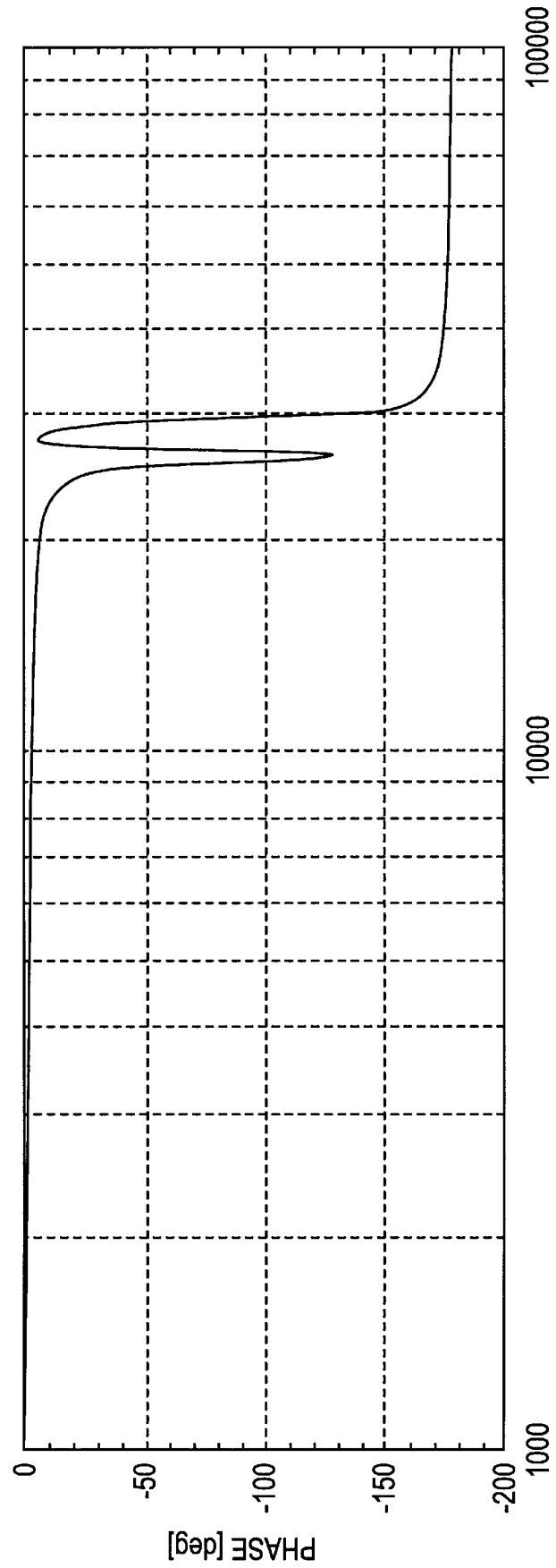

An exemplary frequency response for the mirror is illustrated in FIGS. 6A and 6B with respect to gain and phase, respectively. At about 25000 rad/sec, the mirror resonates, as represented by the spike up 605. Spike down 610 illustrates an anti-resonance. An anti-resonance acts like a natural attenuator wherein energy input at the particular frequency of the anti-resonance will not cause the mirror to shake. Finally, the mirror resonates at approximately 29000 rad/sec, as represented by spike up 615. Because different mirrors will have different frequency responses, the values used for mirror modes response 430 have to be recalculated for the particular type of mirror used in the gimbal assembly.

The values presented in FIGS. 5 and 6, though illustrative, do reflect a typical response to a swept sinusoid waveform. More specifically, the value in the numerator in FIG. 5 represents an anti-resonance and is illustrated in FIG. 6 by the spike down. The value in the denominator represents a mirror mode and is illustrated in FIG. 6 by a spike up. The values are in radians. Therefore, taking the values and dividing by 2*pi generates the frequency response of the mirror in hertz. It is within the skill of an ordinary artisan to calculate the mirror response of a particular type of mirror.

Referring again to FIG. 4, the output signal of mirror modes response 430 which represents mirror acceleration is applied to an integrator 431 and to a feedback loop configured in accordance with the present invention as an active vibra-acoustic damper 440. The integrator 431 integrates the mirror acceleration signal to produce a signal which represents mirror velocity. The mirror velocity signal is fed back to summing junction 428 via gain block 436. The mirror velocity signal produced by integrator 431 is also applied to integrator 432. Integrator 432 integrates the mirror velocity signal, thereby producing a signal which represents mirror position. The mirror position signal is fed back to summing junction 424 via amplifier 437.

The output signal of mirror modes response 430 applied to active vibra-acoustic damper 440 is received by accelerometer 433. Accelerometer 433 uses the mirror acceleration signal to measure mirror vibration due to the influence of ambient acoustic noise signal 438. Hence, the output signal of accelerometer 433 represents mirror acceleration. The mirror acceleration signal is applied to active damper filter 434. The active damper filter 434 provides gain and phase stability, such that the gimbal assembly is stable.

Figure 7:
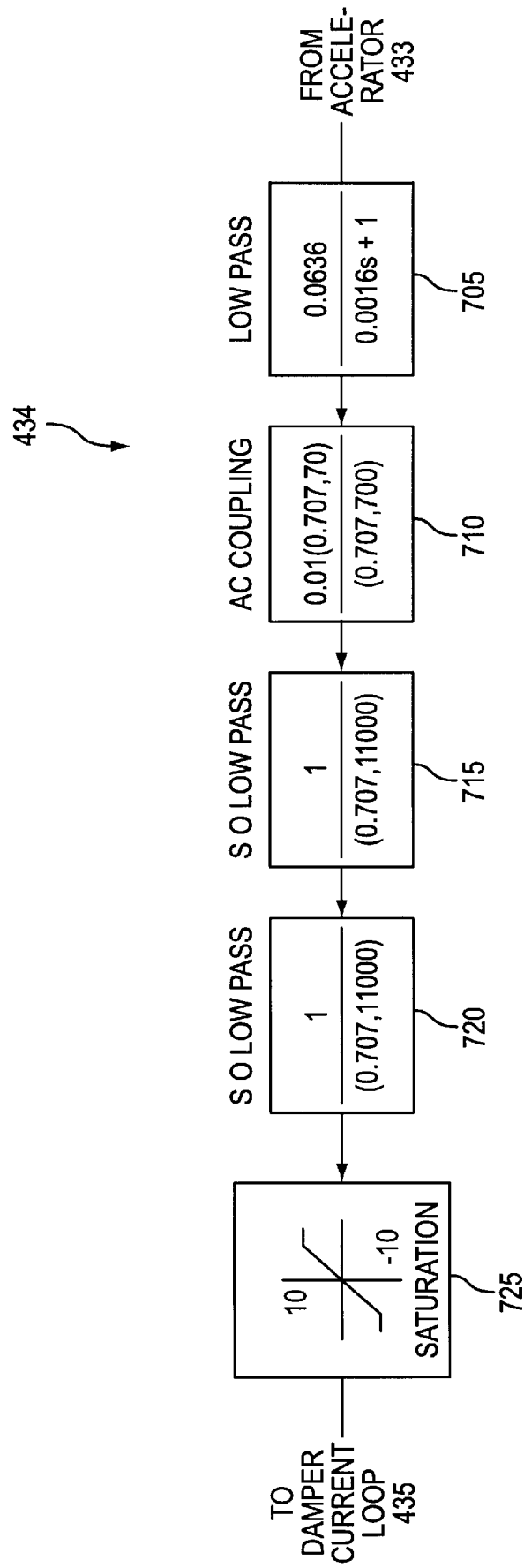
FIG. 7 is a block diagram of the FIG. 4 active damping compensator in accordance with an exemplary embodiment of the present invention.

FIG. 7 shows in greater detail the active damper filter 434 in accordance with an exemplary embodiment. As illustrated, active damper filter 434 comprises low pass filter 705, alternating current (AC) coupling 710, second order low pass filters 715 and 720, and limiter 725. The mirror vibration signal from accelerometer 433 is forwarded to low pass filter 705. Low pass filter 705 is used to help prevent the damper from influencing the mirror at low frequencies.

From low pass filter 705, the signal is applied to AC coupling 710. AC coupling 710 is a second order AC filter which further prevents the damper from influencing the mirror at low frequencies. The AC coupling 710 attenuates frequencies below 100 hertz, or below any desired frequency cutoff at or around 100 hertz (e.g., 110 hertz). The AC coupling filter 710 and the lowpass filter 705 together prevent the active damper from interfering with normal gimbal assembly operation. Normal gimbal assembly operation refers to the rotation of the gimbal assembly in response to a position command. The position command causes the belt driven gimbal assembly to rotate to the proper position, wherein the rotation occurs at frequencies below 100 hertz. Therefore, the elimination of low frequency influence (i.e., below 100 hertz) prevents the active vibra-acoustic damper from counteracting proper rotation of the gimbal assembly.

The signal output from AC filter 710 is applied to a second order low pass filter 715. The output signal of the second order low pass filter 715 is applied to another second order low pass filter 720. Second order low pass filters 715 and 720 ensure that the vibra-acoustic active damper does not respond to frequencies above 2,000 hertz, or any desired frequency at or around 2000 hertz. In doing so, the active vibra-acoustic damper is precluded from responding to signals in a frequency range where the mirror resonance spikes exist. The output signal of second order low pass filter 720 is applied to limiter 725, which models saturation. The output signal of limiter 725 is applied to damper current loop 435. Damper current loop 435 represents a servo amplifier and a limited angle torque motor.

Figure 8:
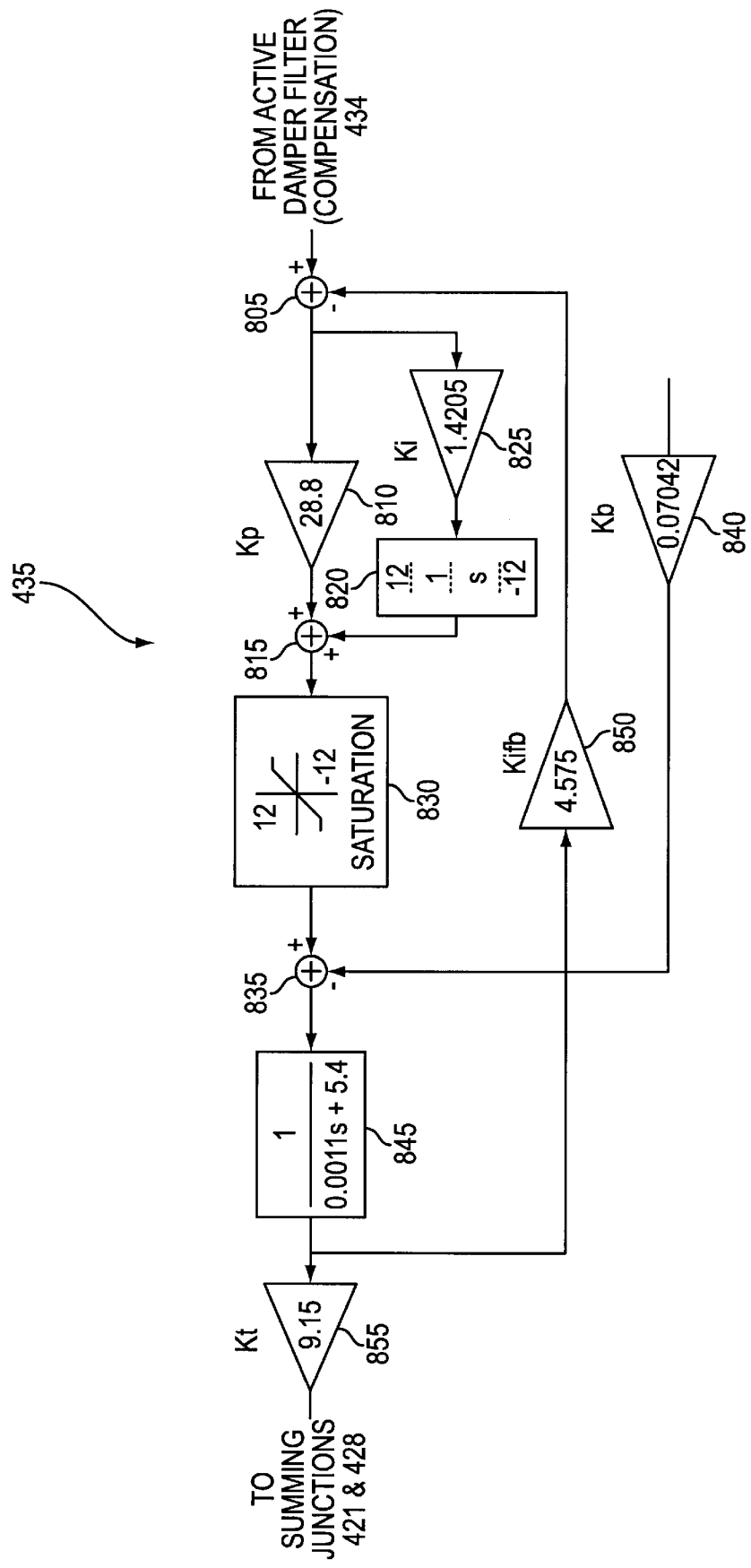
FIG. 8 is a block diagram of a damper current loop and motor model in accordance with an exemplary embodiment of the present invention.

FIG. 8 illustrates in greater detail the components of exemplary damper current loop 435. Damper current loop 435 comprises summing junctions 805, 815 and 835, gain blocks 810, 825, 840, 850, and 855, voltage limiter 830, integrator 820 and damper motor model 845. Summing junction 805, subtracts the signal amplified by gain block 850 from the active damper filter signal. The output signal of summing junction 805 is applied to gain block 810 which outputs a signal reflecting the proportional gain of the motor which drives the gimbal assembly. The output signal of summing junction 805 is also applied to gain block 825 which amplifies the signal by a gain factor of 140,000 in an exemplary embodiment of the present invention.

The amplified signal is applied to integrator 820. Integrator 820 produces a signal representative of the integral gain of the gimbal assembly drive motor. The integral gain signal and the proportional gain signal are added together at summing junction 815. The output signal of summing junction 815 passes through voltage limiter 830. The output signal of voltage limiter 830 is one of two inputs to summing junction 835. The other input signal to summing junction 835 is the output signal from amplifier 840, which represents the back electromotive force (EMF) of the motor. The summing junction 835 subtracts this signal from the output signal of voltage limiter 830.

The output signal of summing junction 835 is applied to motor model 845. Motor model 845 represents inverse of the sum of resistance and inductance resistance of the gimbal assembly drive motor. The output signal of motor modal 845 is applied to block 855, representing the damper motor torque constant, and is fed back to summing junction 805 through gain block 850. Damper current loop 435 outputs a signal representing the torque generated by the damped motor which closely matches the input signal to damper current loop 435.

Referring again to FIG. 4, the signal from damper current loop 435 feeds back to summing junction 428. Accordingly, it is desired that the signal which is output from damper current loop 435 closely matches the ambient acoustic noise signal 438, so as to attenuate (i.e., reduce and/or cancel) the disturbance torque induced by the noise signal.

Figure 1A:
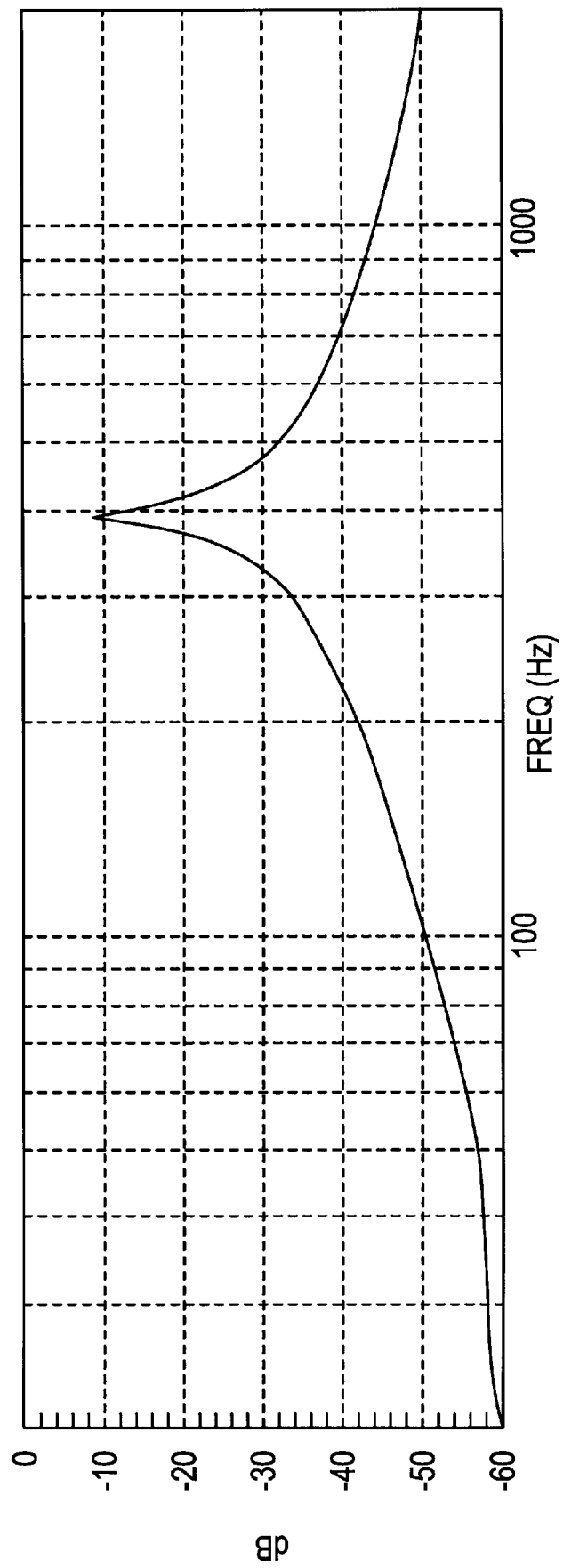
FIGS. 1A and 1B are exemplary graphs of the gain and phase response of a conventional 2:1 belt mirror drive without vibra-acoustic damping.
Figure 1B:
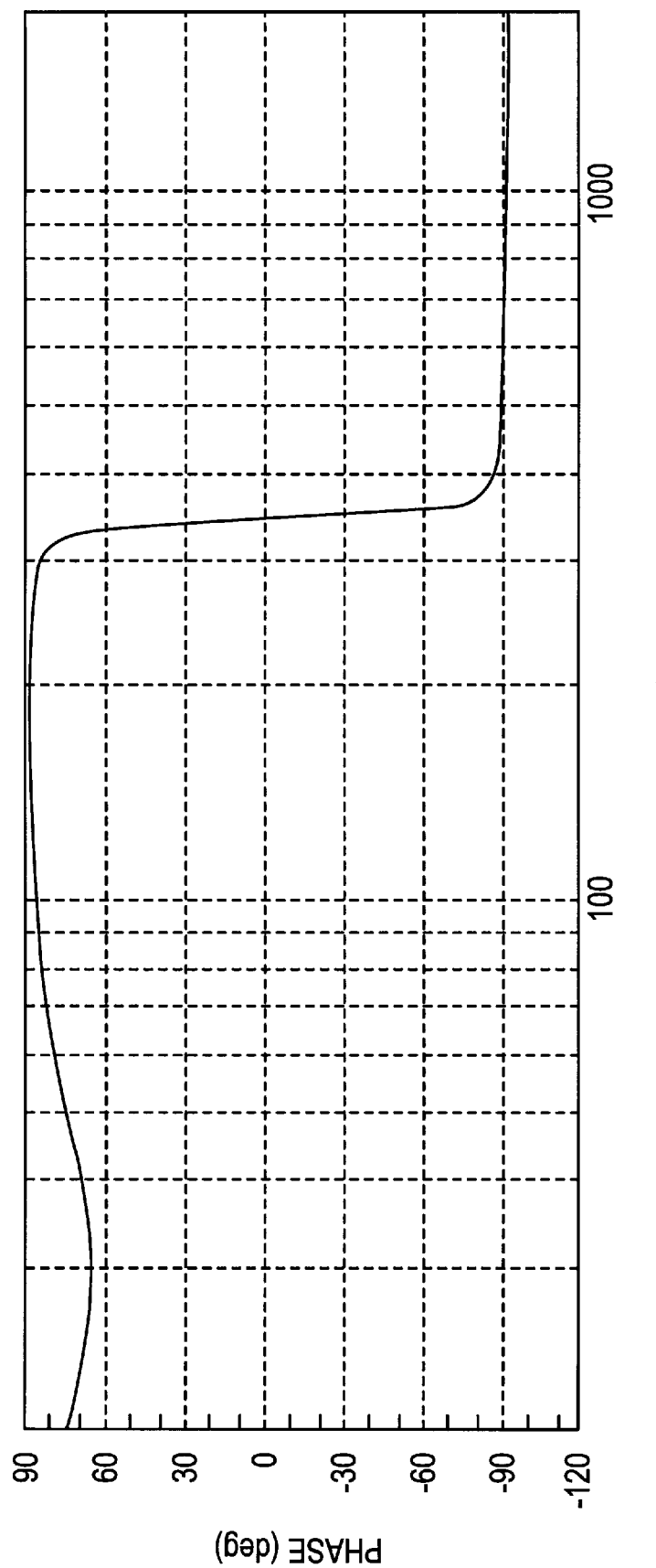
Figure 9B:
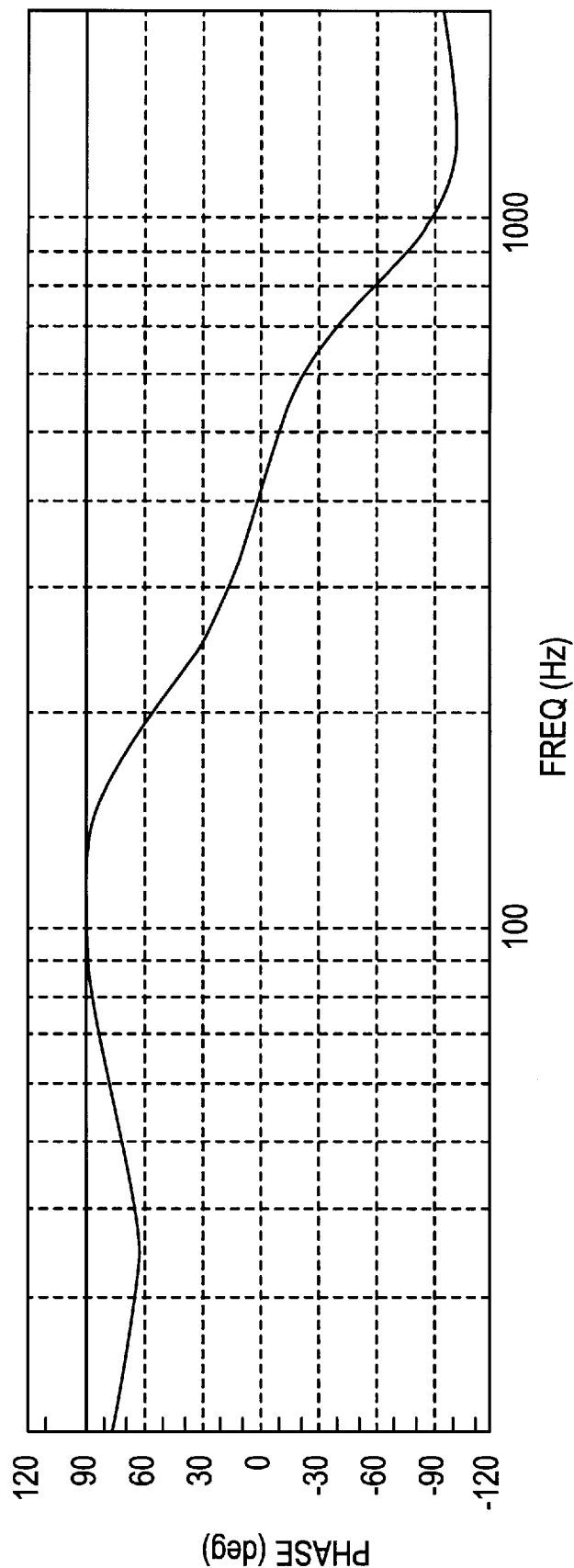

FIGS. 1A and 9A show the mirror torque to velocity without active damping and with active damping, respectively. As can be seen in FIG. 1A, the mirror becomes excitable between 100 hertz and 1000 hertz, specifically around 400 Hertz, as evidenced by the 52 decibel gain in the signal. However, as can be seen in FIG. 9A, with active damping there is very little gain between 100 hertz and 1000 hertz. Therefore, as can be seen by comparing FIGS. 1A and 9A, active damping substantially eliminates the undesired noise in the torque signal.

Figure 10:
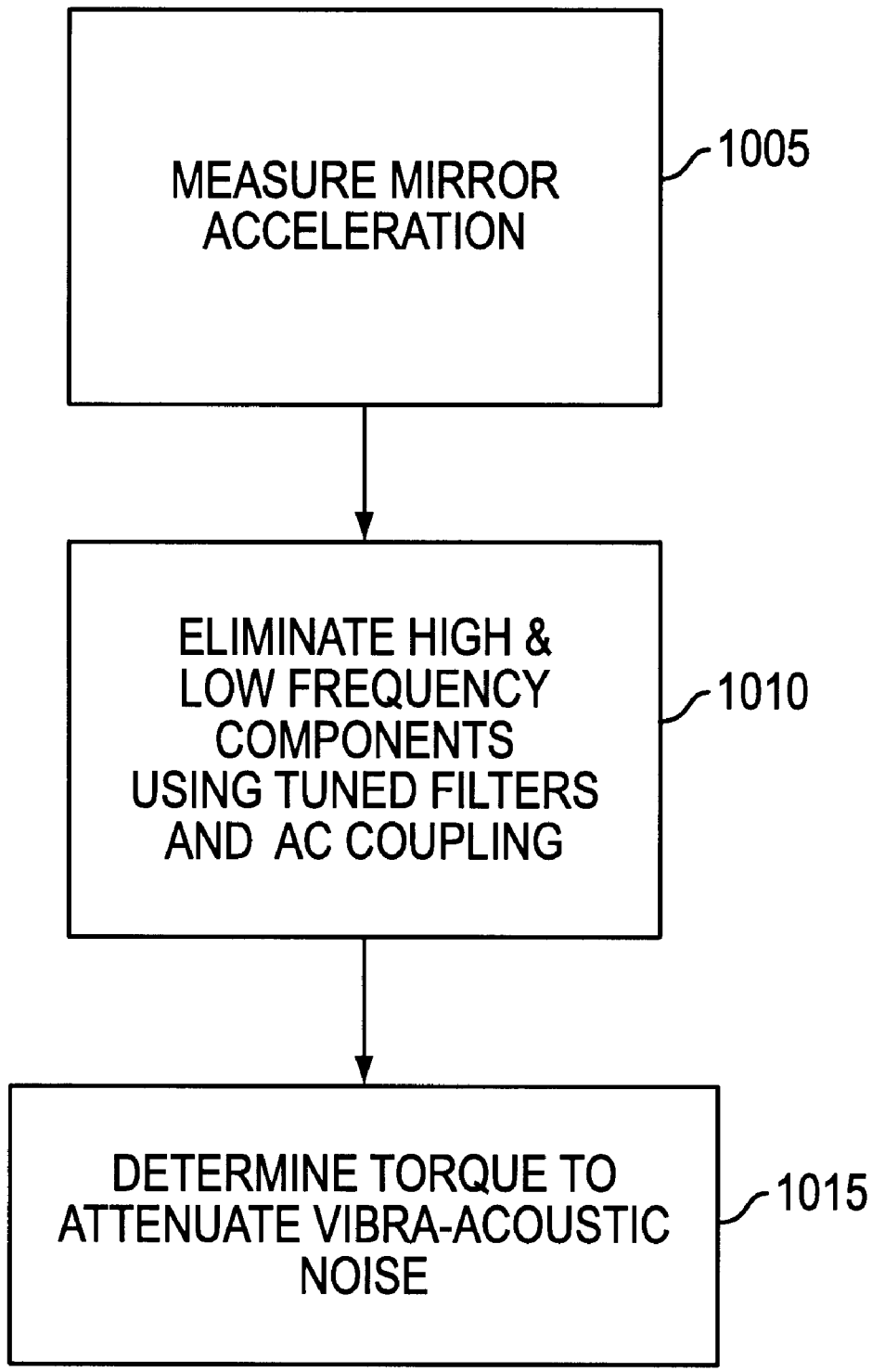
FIG. 10 is a flow chart illustrating operation of an exemplary active vibra-acoustic damper in accordance with the present invention.

The overall operation of the active vibra-acoustic damper is illustrated in FIG. 10. First, at step 1005, the acceleration of the mirror is measured. In step 1010, the high and low frequency signals are eliminated using tuned filters and alternating current coupling. In step 1015, the torque needed to attenuate the vibra-acoustic noise is determined. For example, a signal representing torque needed to attenuate the vibra-acoustic noise can be compared against a reference torque (e.g., zero) and used as the torque command signal which enters the motor.

The above-described exemplary embodiment is intended to be illustrative in all respects, rather than restrictive, of the present invention. The present invention is capable of many variations in detailed implementations that can be derived from the description contained herein by a person skilled in the art. For example, although the system was described using a 2:1 belt drive, the system can easily be modified to accommodate all types of gearing ratios for the belt drive. Further, although the numbers used for the mirror response modes represent known constants for the particular mirror used in the present system, constants for other types of mirrors may easily be substituted. Finally, although specific values have been used in describing the functions of amplifiers and filters, such values are intended to be merely exemplary and not limiting. All variations and modifications are considered to be within the scope and spirit of the present invention as defined by the following claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for reducing vibra-acoustic noise disturbances, comprising the steps of:

measuring an acceleration of a mirror;

filtering the measured acceleration to provide a filtered acceleration signal; and determining a feedback torque to attenuate said vibra-acoustic noise using said filtered acceleration signal, wherein the acceleration signal is filtered to substantially prevent the determined feedback torque from interfering with the normal operation of the mirror.

2. A method in accordance with claim 1, wherein frequencies above 2,000 hertz are filtered.

3. A method in accordance with claim 2, wherein frequencies below 100 hertz are filtered.

4. A method in accordance with claim 1, wherein said mirror is part of a belt drive gimbal system.

5. A method in accordance with claim 4, wherein said belt drive gimbal system is used to position optics for use with a forward-looking infrared subsystem.

6. A method in accordance with claim 4, wherein said belt drive gimbal system is used to position optics for use with a laser subsystem.

7. A gimbal belt drive system for reducing vibra-acoustic noise disturbance, comprising:

means for measuring an acceleration of a mirror;

means for filtering said measured acceleration to provide a filtered acceleration signal;

means for determining a torque induced by said vibra-acoustic noise from said filtered acceleration signal;

means for subtracting said torque induced by said vibra-acoustic noise from a torque command for a drive motor of said mirror, wherein the acceleration signal is filtered to substantially prevent the determined torque induced by the determined vibra-acoustic noise from interfering with the normal operation of the mirror.

8. A system in accordance with claim 7, wherein frequencies above 2,000 hertz are filtered.

9. A system in accordance with claim 8, wherein frequencies below 100 hertz are filtered.

10. A gimbal assembly having a belt driven mirror, comprising:

an accelerometer for measuring mirror acceleration;

a filter for removing frequencies from said measured mirror acceleration;

a damper current loop for determining a torque induced by a vibra-acoustic disturbance from said filtered mirror acceleration; and a summing junction for subtracting said torque induced by said vibra-acoustic disturbance from a torque command for drive motor of said mirror, wherein the acceleration signal is filtered to substantially prevent the determined torque induced by the vibra-acoustic disturbance from interfering with the normal operation of the mirror.

11. An apparatus in accordance with claim 10, wherein frequencies above 2,000 hertz are filtered.

12. An apparatus in accordance with claim 10, wherein frequencies below 100 hertz are filtered.

13. An apparatus in accordance with claim 10, wherein said filter comprises:

a low pass filter;

an alternating current coupling; and at least one second order low pass filter, wherein said at least one second order low pass filter prevents the active damper from compensating around mirror modes.

* * * * *